United States Patent [19]

Carter et al.

[11] Patent Number: 5,996,276
[45] Date of Patent: Dec. 7, 1999

[54] AERODYNAMIC TRANSPORT BODY FOR DISTRIBUTION OF BIOLOGICAL AGENTS

[75] Inventors: Lyle Marvin Carter, Shafter; Joseph H. Chesson, Bakersfield; John Victor Penner, Wasco, all of Calif.

[73] Assignee: The United States of America as represented by the United States Department of Agriculture, Washington, D.C.

[21] Appl. No.: 08/933,124

[22] Filed: Sep. 18, 1997

[51] Int. Cl.[6] ................................................. A01M 1/20
[52] U.S. Cl. ................................................... 43/132.1
[58] Field of Search .......................... 43/132.1; 239/171, 239/650; 119/6.5; 273/362, 364, 363

[56] References Cited

U.S. PATENT DOCUMENTS

| | | | |
|---|---|---|---|
| 3,847,113 | 11/1974 | Andreev et al. | 118/40 |
| 4,260,108 | 4/1981 | Maedgen, Jr. | 239/171 |
| 4,453,675 | 6/1984 | Kodadek et al. | 239/675 |
| 4,646,683 | 3/1987 | Maedgen, Jr. | 119/1 |
| 4,801,150 | 1/1989 | Stevenson | 273/362 |
| 4,966,329 | 10/1990 | Show | 239/650 |
| 4,983,390 | 1/1991 | Levy | 424/404 |
| 5,174,581 | 12/1992 | Goodson | 273/363 |
| 5,393,256 | 2/1995 | Mitchell et al. | 446/15 |
| 5,398,939 | 3/1995 | Lee | 273/362 |
| 5,401,506 | 3/1995 | Chang et al. | 424/408 |
| 5,467,998 | 11/1995 | Hellings | 273/363 |
| 5,484,504 | 1/1996 | Tedders, Jr. et al. | 156/433 |
| 5,575,479 | 11/1996 | Ayers | 273/378 |
| 5,649,707 | 7/1997 | Brander et al. | 273/362 |
| 5,676,377 | 10/1997 | Lynn, Jr. et al. | 273/362 |
| 5,799,616 | 9/1998 | McClung, III | 119/709 |

OTHER PUBLICATIONS

S.H. Dreistadt et al., "Predation by *Iridomyrmex Humilis* [Hym.: Formicidal] On Eggs of Chrysoperla Carnea [Neu.: Chrysopidae] Rleased for Inundative Control of *Illinoia Liriodendri*[Hom.: Aphididae] Infesting *Liriodendron Tulipifera*", In: Entomophaga vol. 31:397–400 (1986).

J.E. Bryant et al., "Desposition Characteristics of Aerially Applied *Bacillus thuringiensis*to a Harwood Forest with Hydraulic Nozzles", In: Journal of Economic Entomology vol. 84:842–551 (1991).

*Primary Examiner*—Charles T. Jordon
*Assistant Examiner*—Jeffrey Howell
*Attorney, Agent, or Firm*—M. Howard Silverstein; Nancy J. Parsons; Thanda Wai

[57] ABSTRACT

A method and aerodynamic transport body for delivering biological control agents into a field is provided. The aerodynamic transport body is a biodegradable device into which the biological control agent is placed and then the device is projected into the field using a catapult.

10 Claims, No Drawings

AERODYNAMIC TRANSPORT BODY FOR DISTRIBUTION OF BIOLOGICAL AGENTS

BACKGROUND OF THE INVENTION

This invention relates to methods and apparatus for the application of biologicals onto field crops. More particularly, this invention relates to methods and apparatus for the application of predaceous or parasitic arthropods and/or living organisms onto field crops.

Chemical insecticides are commonly used to control insect pests that damage agricultural commodities. However, the use of chemical insecticides has several drawbacks including insecticide residue on commodities, resistance of insects, hazardous exposure to insecticides during application, environmental contamination, and destruction of natural biocontrol agents. Specific examples of the adverse effects of intensive chemical insecticide use are as follows:

(1) high level of tolerance to toxic compounds some insects have developed in recent years, leading to more frequent and heavier application of the toxic compounds to eliminate the pests;
(2) an accumulation in the soil of non-biodegradable elements harmful to man;
(3) absorption of toxic elements by the plant both through the root system and its foliage;
(4) medical research linking the consumption of these toxic substances through food to certain diseases.

An alternative to chemical insecticides is the use of biological control agents. Biological control of insect pests involves the manipulation of certain beneficial organisms to reduce a population of pest organisms. The importance of biological control of insect pests in field crops has been recognized, and its use is rising. The use of biological control is especially desirable for high value fruit and vegetable crops grown for the fresh produce market, where the use of chemical insecticides is of concern to the consumer.

One technique for biological control is the augmentation of predaceous or parasitic arthropods which prey on selected pests. Recent advances in mass rearing beneficial arthropods, however, does not always result in successful biological control. For augmentation of beneficial arthropods to be successful in a field situation, mass releases of the beneficial arthropods must be achieved. For mass release of the beneficial arthropods to be effective, the arthropods must survive the distribution procedure and live long enough to find the pest insects. Problems with practical and reliable methods of distribution of the beneficial arthropods have prevented the wide-spread use of these alternatives to chemical insecticides. Another important consideration is cost of equipment and labor required for delivery of the beneficial arthropods.

In the past, parasite or predator insect eggs have been manually placed on plants, or attached to string which is then manually placed on individual plants (Tedders, Jr. et al. U.S. Pat. No. 5,484,504). The major disadvantage of this type of application is the time and labor involved in entering the field to manually place the eggs or egg-coated strings on plants. In an effort to provide more wide-spread application, Maedgen, Jr. (U.S. Pat. No. 4,260,108) teaches a method and apparatus for airborne release of insect eggs. This method has the disadvantage of requiring an airplane or other aerial application means and is restrictive to certain insects and developmental stages.

Predatory mites are another type of biological control agent, with its own distribution problems. Show (U.S. Pat. No. 4,966,329) teaches a field applicator for distributing predatory mites in a carrier material. The device consists of a container with interior baffles for mixing the mites and carrier material for even distribution. Show teaches variations of the device for manual application and an automated applicator attached to a vehicle. The automated version involves a plurality of applicators for simultaneously dispensing the mite and carrier mixture among a plurality of adjacent plant beds. Disadvantages of this type of automated device are that it must be taken into the field, it requires a carrier, and it requires mixing which is damaging to certain biological control agents.

Many methods of distributing biological control agents require workers alone or using machinery to repeatedly enter the field. This activity has the disadvantages of high labor costs and increased time required, which may prevent the consideration of biological control over chemical insecticides. Repeated passages through the field may also damage delicate crops, compact the soil after rain or irrigation, and may increase the distribution of weed seeds and pest insects throughout the field.

It has been discovered that many types of biological control agents can be delivered into a field by the use of an aerodynamic transport body (ATB). The aerodynamic transport body is a biodegradable delivery device which is projected into an agricultural field. Biological control agents are placed inside the delivery device. Upon landing in the field, the biological control agents exit the delivery device through an opening.

SUMMARY OF THE INVENTION

An object of the present invention is to provide a biodegradable delivery device for delivering biological control agents into a field. Another object is to provide a method of distributing biological control agents in a field. A further object of the present invention is to provide a single distribution device suitable for a large variety of biological control agents in a variety of developmental stages.

The delivery device of the preferred embodiment is hollow and saucer shaped with a domed upper surface and flat lower surface. The delivery device is adapted to be projected through the air by a catapult or similar device capable of imparting both a linear and a rotational motion to the delivery device. Examples, of such devices are the conventional manual or mechanical skeet or clay pigeon projecting devices. An opening providing access into the interior of the delivery device is centrally located on either the dome or the lower surface. The opening provides the means for the biological control agent to exit the delivery device upon landing in the field. The placement and size of the opening depends on the behavioral characteristics of the biological control agent being used. The biological control agent is placed inside the delivery device. The delivery device is catapulted into the field where the biological control agent exits through the opening. The delivery device is made of biodegradable materials which will break down within a few irrigation or rain cycles.

DETAILED DESCRIPTION OF THE INVENTION

According to one aspect of the invention, the aerodynamic transport body is a saucer shaped delivery device with a domed upper surface which provides aerodynamic lift, and a flat lower surface. Biological control agents are placed inside the delivery device through an opening in either the upper or lower surface, and a temporary seal is placed over the opening. Immediately prior to launch of the delivery device, the seal is removed or broken. The delivery device can be manually projected into the field, or a catapult such as those used in skeet or target shooting may be used to launch the delivery device into a field. During flight, the centrifugal force keeps the biological control agents inside the delivery device. Upon landing, the biological control agents exit the delivery device through the opening. Aspects of the aerodynamic transport body such as size and placement of the opening may be adapted to the requirements and behavioral characteristics of specific biological control agents. Additionally, depending on the developmental stage of the biological control agent, a temporary food source and/or source of moisture such as water may be included inside the delivery device. This allows the aerodynamic transport body to be used for predatory or parasitic arthropods which are introduced into the field in an egg or larval stage. Short term storage of the biological control agent in the delivery device is also possible with the addition of a food source and/or moisture source.

Another embodiment of the instant invention involves a two-part delivery device comprising an aerodynamic shell and a container designed to fit inside the shell. The biological control agents are placed inside the container, which is then inserted into the shell prior to projection into the field. Both the shell and interior container are biodegradable.

The size and shape of the delivery device are adapted to have an aerodynamic structure which permits the delivery device to be projected with considerable speed into the air by the catapult. The delivery device is constructed of biodegradable materials which are able to withstand the projecting force of the catapult mechanism such that the delivery device retains its integral configuration when projected.

Suitable materials for making the delivery device include any non-toxic bindable material that will break down within a few irrigation or rain cycles. Examples include compacted peat moss, molded paper slurry, compacted manure, limestone with a biodegradable binder, compacted fertilizer pellets, compressed almond hulls or walnut shells, sea-weed, tree bark, alfalfa hay, compacted soil, and ground plant derivatives such as soybean hulls, corn cobs, corn bran, etc.

A wide variety of biological control agents can be used with the aerodynamic transport body. Examples of suitable biological control agents include *Lygus hesperus,* parasitic wasps such as *Aphelinus* nr. *paramali,* lacewing eggs, parasitic or predaceous mites and spiders, nematodes, and viral or bacterial agents. The use of viral or bacterial agents would require an arthropod or other suitable carrier. Survival of the biological control agents during launch, flight and landing is excellent. The forces of launch and flight have been studied. The launch accelerates the aerodynamic transport body to greater than 110 mph creating a combined g-force of greater than 175 g. During flight the rotation starts at greater than 100 rpm creating a force of about 1 g holding the biological control agents against the inner surface and away from the opening. It was surprising that arthropods survive these considerable forces. The results of an experiment using *Lygus hesperus* are shown in Table 1. The $2^{nd}$ and $3^{rd}$ instar nymphs were used because the insects are delicate in these stages.

TABLE 1

| Biological Control Agent | # launched | # damaged but alive | # dead |
|---|---|---|---|
| Lygus hesperus $2^{nd}$ instar | 20 | 0 | 0 |
| Lygus hesperus $3^{rd}$ instar | 80 | 1 | 0 |

An experiment using the tiny parasitic wasp *Aphelinus* nr. *paramali* also showed excellent survival of the insects. The results of this experiment are shown in Table 2.

TABLE 2

| Biological Control Agent | # launched | # damaged but alive | # dead |
|---|---|---|---|
| Aphelinus nr. paramali | 12 | 0 | 0 |

As shown in Table 1 and Table 2, the aerodynamic transport body is successful in delivering delicate biological control agents into the field unharmed.

Testing other biological control agents for survival in the aerodynamic transport body is a simple procedure. A defined number of biological control agents are placed inside the aerodynamic transport body and the opening is sealed. The seal is not broken or removed prior to launch. The aerodynamic transport body is launched and recovered. The seal is then removed and the number of live, damaged, and dead biological control agents is counted. For eggs, the same procedure is followed, except that after recovery, the aerodynamic transport body is left to allow for hatching of the insects. The number of live hatched insects is compared to the initial number of eggs.

Several approaches to delivering the aerodynamic transport bodies into fields can be used, depending on the size of the field and available equipment. An automatic clay pigeon projecting device mounted on a truck, tractor or all-terrain vehicle is the preferred method. A vehicle-mounted launch device driven around the perimeter of the field allows placement of the aerodynamic transport bodies over 50 yards into the field. This method of delivery is much faster than manually placing containers of biological control agents near plants, and is comparable in application time to ground spraying of insecticides. Another advantage of the instant method is that it reduces the number of times workers must enter the field. For small fields, the entire application of biological control agents can be performed from the perimeter of the field. For larger fields, only a few passes at large distances are needed to distribute the biological control agents over the entire field. The number of passes depends on the projecting distance of the catapult.

A further advantage of the instant method is that of delivering the biological control agents to specific locations where the pest load is greatest, such as the edges of a field when a pest population is first entering a field. This is especially helpful in preventing the spread of pest insects from one field to another.

While this invention has been disclosed with reference to specific embodiments, it is apparent that other embodiments and equivalent variations of this invention may be devised by those skilled in the art without departing from the true spirit and scope of this invention. The appended claims are intended to be construed to include all such embodiments and equivalent variations.

We claim:

1. A method for delivering living organisms used as a biological control agent into a field, said method comprising placing said biological control agent into a biodegradable delivery device and projecting said delivery device into said field; said delivery device comprising a shell with an aerodynamic shape capable of withstanding mechanical impacts during launch from a catapult or similar projecting device capable of imparting both a linear and a rotational motion to said delivery device; said delivery device further being capable of retaining said living organisms until the device lands in the field.

2. The method of claim 1, wherein said biodegradable delivery device is projected using an automatic catapult mounted on a vehicle.

3. The method of claim 1, wherein said biodegradable delivery device is projected from the perimeter of said field.

4. The method of claim 1, wherein said biodegradable delivery device comprises a hollow saucer shaped aerodynamic shell comprising a domed upper surface and a flat lower surface, said shell having, in either said domed upper surface or said flat lower surface, a centrally located opening to provide access into the interior of said shell.

5. The method of claim 4, wherein a breakable seal covers said opening to prevent loss of said biological control agents prior to use.

6. An aerodynamic transport device which holds living organisms used for biological control agents, wherein said device is biodegradable and saucer shaped with a domed upper surface to provide aerodynamic lift, and a flat lower surface, said device having, in either the domed upper surface or the flat lower surface, a centrally located opening to provide access into the interior of said device.

7. The aerodynamic transport device of claim 6 wherein a breakable seal covers said opening to prevent loss of said biological control agents prior to use.

8. The aerodynamic transport device of claim 6 having centrally located openings in both said domed upper surface and said flat lower surface.

9. The aerodynamic transport device of claim 8 wherein a breakable seal covers said openings to prevent loss of said biological control agents prior to use.

10. The aerodynamic transport device of claim 6 wherein said device comprises a removable biodegradable interior container for housing biological control agents, said interior container having a centrally located opening which is superimposed over the opening in the transport device.

* * * * *